July 14, 1936.  H. A. SMITH ET AL  2,047,838
MOUNTING FOR DYNAMO-ELECTRIC MACHINES
Filed Sept. 20, 1935
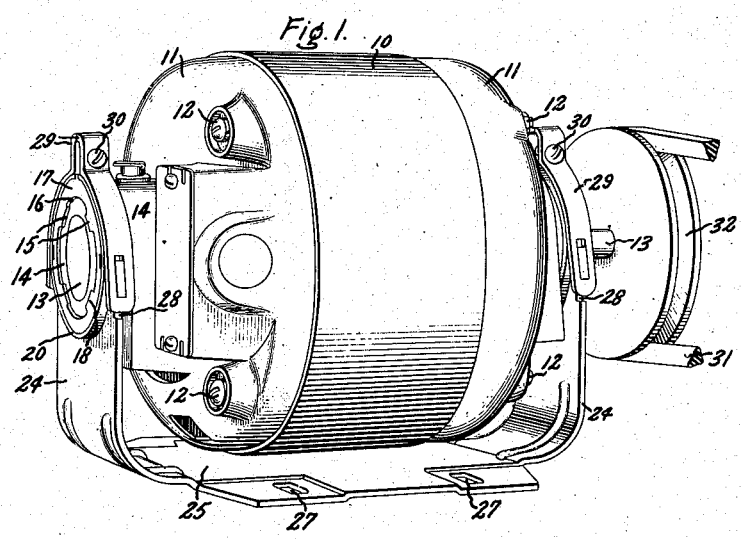
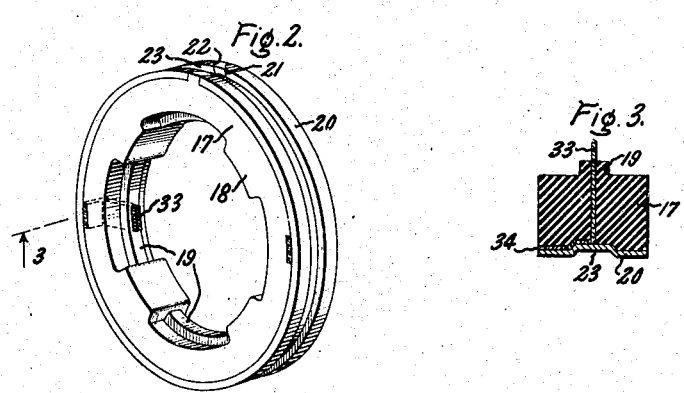
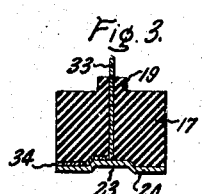
Inventor
Henry A. Smith,
Claude M. Summers,
by Harry E. Dunlap
His Attorney.

Patented July 14, 1936

2,047,838

UNITED STATES PATENT OFFICE 2,047,838

MOUNTING FOR DYNAMO-ELECTRIC MACHINES

Henry A. Smith and Claude M. Summers, Fort Wayne, Ind., assignors to General Electric Company, a corporation of New York Application September 20, 1935, Serial No. 41,427

14 Claims. (Cl. 175—264)

Our invention relates to mountings for dynamo-electric machines and the like.

Present methods for insulating vibration and suppressing noise often involves the mounting of machines on rubber or other electrical insulating material. Where such machines are connected to a driven or driving apparatus by a frictional driving connection, such as a belt drive between a rubber mounted motor and its load, the friction of the drive may generate sufficient static electricity and electrically charge the insulated machine, to produce an electrical discharge between the charged parts. Such a spark is not dangerous, but may become very annoying and undesirable, for it will produce the sensation of a shock if any of the charged parts are touched. The voltage of this static electrical charge may also become sufficient to produce ozone, which will in time damage the rubber mounting. In certain applications, such as in washing machines, which may be highly insulated from the ground, it has been found undesirable to make a low resistance ground connection between the motor and its mounting, because of the hazard introduced if the motor itself should become electrically grounded.

An object of our invention is to provide a mounting utilizing resilient electrical insulating material, such as rubber, for supporting a dynamo-electric machine or the like, which is constructed to equalize the electrical potential between the inner and outer surfaces of the support to prevent the accumulation and discharge of static electricity between the insulated machine and ground, but constructed to avoid the hazard of a direct ground of the machine.

Our invention will be more fully set forth in the following description referring to the accompanying drawing, and the features of novelty which characterize our invention will be pointed out with particularity in the claims annexed to and forming a part of this specification.

For a better understanding of our invention, reference is made to the accompanying drawing wherein Fig. 1 is a perspective view of a dynamo-electric machine having a mounting embodying our invention; Fig. 2 is a perspective view of an annulus of insulating material supported in a metal band and provided with electrically conductive high resistance elements extending from the inner surfaces of the mounting and through the insulating material into electrical contact with the metal band; and Fig. 3 is a sectional view taken on line 3—3 of Fig. 2.

Our invention is shown as applied to a dynamo-electric machine having a stationary member comprising a frame 10 to which end shields 11 are secured by bolts 12. A rotatable member of the dynamo-electric machine is mounted on a shaft 13, which is journaled in hubs 14 formed on the end shields 11 concentric with the axis of the shaft 13, and having axially extending notches 15 and circumferential grooves 16 formed therein intermediate the notches 15.

The dynamo-electric machine is supported by a mounting comprising electrically insulating annuluses 17, preferably of a resilient material, such as rubber, so as to minimize the transmission of vibrations between the stationary member and its support. The inner surfaces of the annuluses 17 are formed with complementary projections 18 and circumferential ribs 19 arranged to engage the notches 15 and grooves 16 of the hubs 14. The projections 18 cushion torsional vibrations and prevent relative rotation between the annuluses of resilient material and the stationary member of the dynamo-electric machine and the engagement of the ribs 19 in the grooves 16 prevent axial movement of the stationary member with respect to the annuluses 17. An electrically conductive metal band 20, having spaced ends 21 and 22 and a circumferential groove 23 formed therein, is secured or joined to the outer surface of the annuluses 17, preferably by bonding directly to the insulating material. The dynamo-electric machine is supported by a U-shaped base comprising vertical open end supports 24 arranged at each end of the machine and an integral plate 25, joining the supports 24, and is provided with mounting holes 27. The open ends of the supports 24 are arranged to engage the grooves 23 in the bands 20, at the opposite ends of the dynamo-electric machine, and are formed with notches 28 which engage the ends of clamps 29. Each of the bands 20 is secured against rotation by tightening the clamps 29 by adjustment of the screws 30, which vary the clamping pressure by drawing together the two halves of the clamps 29. By this arrangement, the inner surfaces of the annuluses 17 are secured to the hubs 14 and the bands 20 are secured to the support. The dynamo-electric machine is readily inserted in the mounting by removal of the clamps 29.

The foregoing described mounting is not our invention, but is the invention of Alfred F. Welch, and is described and claimed in his application, Serial No. 727,432, filed May 25, 1934, which is assigned to the General Electric Company, assignee of our present invention, which application is to be regarded as prior art with respect to this application.

This type of mounting arrangement is readily adaptable to various applications, such as motor driven washing machine agitators, mechanical refrigerating apparatus, etc., which may be driven by a belt 31 having a frictional driving connection with a driving pulley 32 mounted upon the dynamo-electric machine shaft 13. The friction of such a driving connection may generate sufficient static electricity to cause undesirable static discharges between the dynamo-electric machine and ground.

In accordance with our invention, the accumulation of a static electric charge upon the insulated dynamo-electric machine is prevented by arranging an electrically conductive element 33 in contact with the metallic hub 14 and the metallic band 20. This electrically conductive element is preferably formed of a high resistance material. It would be undesirable to utilize a low resistance ground connection between a dynamo-electric machine and its mounting, as this would introduce the possible hazard of a serious ground in the dynamo-electric machine circuit if part of the electrical circuit of the dynamo-electric machine should become grounded. We have determined experimentally that a resistance of eighty megohms is sufficiently low to prevent the accumulation of a static charge upon the dynamo-electric machine and that a resistance of one megohm is sufficiently high to eliminate any sensation of shock from an average low voltage distribution line of approximately 110 volts. Therefore, in order to eliminate the static charge, and at the same time prevent the hazard of an average line voltage shock to ground, it is desirable to introduce an electrically conducting path of from one to eighty megohms between the insulated dynamo-electric machine and ground.

Various arrangements and materials can be utilized for providing such a conducting path. We prefer to use a strip 33 of fibrous material, such as asbestos cloth, impregnated with an electrically high resistance conductive material, such as graphite or lead peroxide. In the preferred embodiment of our invention, the annuluses 17 are formed of molded resilient rubber bonded to the metallic band 20 and an electrically conductive element 33 is molded in the rubber annuluses, so as to extend beyond the inner surface thereof, through the rubber annuluses, and into electrical contact with the metallic band 20, as indicated at 34 in Fig. 3. The annuluses 17 are fitted on the hub 14 by aligning the projections 18 with the notches 15 and pressing the annuluses into position. When thus mounted, the inner end of the electrically conductive element 33 forms a good electrical contact with the metallic hub 14 and the electrical potential is equalized between the metallic elements in contact with the inner and outer surfaces of the insulating annuluses 17.

While we have illustrated and described one embodiment of our invention, modifications thereof will occur to those skilled in the art. We desire it to be understood, therefore, that our invention is not to be limited to the particular arrangement disclosed and we intend, in the appended claims, to cover all modifications which do not depart from the spirit and scope of our invention.

What we claim as new and desire to secure by Letters Patent in the United States is:

1. A dynamo-electric machine or the like having a rotatable member and a stationary member of electrically conductive material, a resilient member of electrically insulating material surrounding at least a portion of said stationary member, an electrically conductive support for said resilient member, and means including an electrically conductive element carried by said resilient member between the inner and outer surfaces thereof for equalizing the electrical potential between said surfaces.

2. A dynamo-electric machine or the like including a rotatable member and a stationary member of electrically conductive material, a member of resilient insulating material surrounding at least a portion of said stationary member, means including an electrically conductive support for said resilient insulating member, and means including an electrically conductive high resistance element extending through said resilient insulating material between the inner and outer surfaces thereof for equalizing the electrical potential between said surfaces.

3. A dynamo-electric machine or the like including a rotatable member and a stationary member of electrically conductive material, a member of resilient rubber surrounding at least a portion of said stationary member, an electrically conductive support for said resilient rubber member, and means including an electrically conductive high resistance element molded in said resilient rubber member and extending into contact with said stationary member and said electrically conductive support for equalizing the electrical potential therebetween.

4. A dynamo-electric machine or the like including a rotatable member and a stationary member of electrically conductive material, a member of resilient rubber surrounding at least a portion of said stationary member, an electrically conductive support for said resilient rubber member, and means including a strip of fibrous material impregnated with electrically conductive material and extending into contact with said stationary member and said electrically conductive support for equalizing the electrical potential therebetween.

5. A dynamo-electric machine or the like including a rotatable member and a stationary member of electrically conductive material, a member of resilient rubber surrounding at least a portion of said stationary member, an electrically conductive support for said resilient rubber member, and means including a strip of fibrous material impregnated with graphite and extending into contact with said stationary member and said electrically conductive support for equalizing the electrical potential therebetween.

6. A dynamo-electric machine or the like including a rotatable member and a stationary member of electrically conductive material, a member of resilient rubber surrounding at least a portion of said stationary member, an electrically conductive support for said resilient rubber member, and means including an asbestos cloth strip impregnated with lead peroxide extending between the inner and outer surfaces of said resilient rubber member and in contact with said stationary member and said electrically conductive support for equalizing the electrical potential therebetween.

7. A dynamo-electric machine or the like having a rotatable member provided with a shaft and a stationary member of electrically conductive material, a frictional driving connection mounted on said shaft, a resilient member of electrically insulating material surrounding at least a portion of said stationary member, an electrically conductive support for said resilient member, means including an electrically conductive material carried by said resilient member for equalizing the electrical potential between said stationary member and said electrically conductive support.

8. A dynamo-electric machine or the like having a rotatable member provided with a shaft and a stationary member provided with a hub of electrically conductive material extending about said shaft, a frictional driving connection mounted on said shaft, a mounting for said machine comprising an annulus of resilient rubber fitted on said hub, a metal band secured to the outer surface of said rubber annulus, and means including an asbestos cloth strip impregnated with lead peroxide extending beyond the inner surface of said rubber annulus and therethrough into electrical contact with said metal band and said hub for equalizing the electrical potential therebetween.

9. A dynamo-electric machine or the like having a rotatable member provided with a shaft and a stationary member provided with a hub of electrically conductive material extending about said shaft, said hub having axially extending notches and a circumferential groove therein, a frictional driving connection mounted on said shaft, a mounting for said machine comprising an annulus of resilient rubber having complementary portions on the inner surface thereof arranged to engage said notches and said groove, a metal band secured to the outer surface of said annulus and having spaced ends, means including an asbestos strip impregnated with graphite extending through said resilient rubber into electrical contact with said hub and said metal band for equalizing the electrical potential therebetween, a support having an open end engaging said metal band, and means including a clamp engaging said support for holding said metal band against rotation.

10. A mounting member for a dynamo-electric machine or the like of resilient insulating material formed and arranged to be secured between electrically conductive members, and means including an electrically conductive element extending through said insulating material between the sides thereof and arranged to contact the electrically conductive members for equalizing the electrical potential therebetween.

11. A mounting member for a dynamo-electric machine or the like of resilient insulating material formed and arranged to be secured between electrically conductive members, and means including a strip of fibrous material impregnated with electrically conductive high resistance material extending between the sides thereof and arranged to contact the electrically conductive members for equalizing the electrical potential therebetween.

12. A mounting member of molded insulating material having sides formed and arranged to be secured between electrically conductive members, and means including an electrically conductive high resistance member molded in said insulating material and extending between said sides and beyond one of said sides for equalizing the electrical potential on opposite sides of said insulating material.

13. A mounting member of resilient rubber formed and arranged to be secured between electrically conductive members, and means including an asbestos cloth strip impregnated with lead peroxide extending through said resilient rubber between the sides thereof for equalizing the electrical potential between the electrically conductive members.

14. A mounting member of resilient rubber formed and arranged to be secured between electrically conductive members, and means including a fibrous element impregnated with graphite extending through said resilient rubber for equalizing the electrical potential on opposite sides of said resilient rubber member.

HENRY A. SMITH.
CLAUDE M. SUMMERS.